(12) United States Patent
Lee

(10) Patent No.: US 7,264,735 B2
(45) Date of Patent: Sep. 4, 2007

(54) METHOD FOR PRODUCING DRINKING WATER

(76) Inventor: Won Song Lee, 184-2 Mangu-Dong, Jungrang-Ku, Seoul (KR)

( * ) Notice: Subject to any disclaimer, the term of this patent is extended or adjusted under 35 U.S.C. 154(b) by 115 days.

(21) Appl. No.: 11/251,878

(22) Filed: Oct. 18, 2005

(65) Prior Publication Data

US 2006/0086601 A1   Apr. 27, 2006

(30) Foreign Application Priority Data

Oct. 25, 2004   (KR) ...................... 10-2004-0085521

(51) Int. Cl.
    *C02F 3/00*   (2006.01)
(52) U.S. Cl. ...................... 210/724; 210/754; 210/726; 210/660; 210/664

(58) Field of Classification Search ................. 210/754, 210/724, 726, 660, 664
See application file for complete search history.

(56) References Cited

U.S. PATENT DOCUMENTS 5,770,089 A   6/1998   Kubo

FOREIGN PATENT DOCUMENTS

KR   10-0393826 A   8/2002

*Primary Examiner*—Chester T. Barry
(74) *Attorney, Agent, or Firm*—Birch, Stewart, Kolasch & Birch, LLP

(57) ABSTRACT

The present invention relates to a method for producing drinking water having a reduced cluster width and being capable of emitting FIR (Far Infrared Rays) energy by using a solution derived by chemical treatment of a charge generating material.

1 Claim, No Drawings

METHOD FOR PRODUCING DRINKING WATER

This application claims priority under 35 U.S.C. § 119(a) on Patent Application No. 10-2004-85521 filed in Korea on Oct. 25, 2004, the entire contents of which are hereby incorporated by reference.

BACKGROUND OF THE INVENTION

1. Field of the Invention

The present invention relates to a method for producing drinking water, and more particularly, it relates to a method for producing drinking water having a reduced cluster width and being capable of emitting FIR energy by using a solution derived by chemical treatment of a charge generating material.

2. Background of the Related Art

Generally, edible water means natural mineral water. However, as a result of the development of industry, the natural mineral water is considerably polluted by environmental pollutants. The municipal Waterworks Bureau purifies water by chlorination and precipitation with sand. However, some of the urban population doubts the quality of the water supplied by the waterworks because of the generation of halomethane by chlorine and uses a water purifier in their house. There has been developed a reduction water purifier which partly electrolyze water to reduce the cluster width of the water.

Water has a molecular formula of $H_2O$. In practice, water does not exist as a single molecule but as a cluster (mass, group) of 4 molecules, 6 molecules, etc. According to studies, water with a smaller cluster width is beneficial for human bodies.

According to an investigation of city tap water, the cluster width is 120 Hz, 130 Hz 140 Hz or 150 Hz, average 130 Hz. Water of a famous spring mineral resort has a cluster width of about 100 Hz and water of a long-lived village has a cluster width of about 70 to 80 Hz. Also, it is known that far infrared ray energy can reduce the water cluster width.

Therefore, the water quality is determined by how much the water cluster width can be reduced. The above-described electrolysis reduction water purifier can considerably reduce the water cluster width, Hz, however, the presently used reduction water purifier can hardly reduce the cluster width to 65 Hz below.

SUMMARY OF THE INVENTION

Thus, in order to solve the problems as described above, it is an object of the present invention to provide a method for producing drinking water having a reduced cluster width and being capable of emitting FIR (Far Infrared Rays) energy by using a solution derived by chemical treatment of a charge generating material which can emit FIR energy and comprises components beneficial for human bodies.

Now, the present invention is described in detail.

FIR energy emitting minerals include uranium ores, magnetic ores, tourmaline ores and the like. The uranium ores has a risk of damage by radiation accident and the magnetic ores are difficult to be crushed to powder. Therefore, according to the present invention, tourmaline, which is readily broken, is crushed to powder of 500 mesh or more.

Tourmaline has a formula of $X . Y_9B_3Si_6O_{27}(O . OH . F)_4$, in which X is one or two or more of Ca, Na, K and Mn and Y is one or two or more of Mg, Fe, Al, Cr, Ti and Li.

Tourmaline has colors of black, blue, red, green, violet and white and is in the form of a crystal having a hexagonal structure.

Tourmaline is readily crushed to powder and contains boron helping water absorption. It is also called electric stone and can produce a weak electric current of 0.06 mA.

1500 to 3000 g of distilled water is put into a stirrer and 100 to 210 g of 98% sodium hydroxide and 2 to 5 g of 98% calcium hydroxide are dissolved therein. Then, 100 to 300 g of blue tourmaline of 500 mesh or more as a charge generating material is added thereto. The mixture is stirred at 1000 to 2000 rpm for 30 to 60 minutes to make it a strong alkali.

Next, 100 to 300 g of iron chloride is stirred in the solution and agitated for 60 to 120 minutes until the blue color becomes completely brown color.

After the color changed from blue to brown, the reaction is left for 12 hours for more. Then, hydrochloric acid is added to make the solution pH7 to pH8. The resulting solution is mixed with 1500 to 3000 g of distilled water, while stirring and settled for about 24 hours.

After settlement for 24 hours, the supernatant is separated from the precipitations (brown soil) to produce 3000 to 6000 g of a clear liquid, which is then mixed with 2 to 10 g of active charcoal and distilled to produce 2900 to 5800 g of clean water. The finally produced clean water is an alkaline water of pH 7 and has heavy metals, nitrate, E. coli, bacteria and the like removed.

DETAILED DESCRIPTION OF THE PREFERRED EMBODIMENT

An embodiment according to the above-described method is described as follow.

EXAMPLE 1

1000 g of distilled water, 50 g of 98% sodium hydroxide, 1.5 g of 98% calcium hydroxide, 50 g of tourmaline powder were mixed and stirred at 1700 rpm for 30 minutes.

The reaction showed blue color since blue tourmaline was used.

After the first agitation, 10 g of ferrous chloride and 70 g of ferric chloride were added to the reaction and stirred at 1700 rpm. When the blue color completely changed to brown color, the agitation was stopped and the reaction was settled for 12 hours. Then, hydrochloric acid was added thereto to make the solution pH8 and stirred with 1000 g of distilled water, followed by settlement of 24 hours.

After the third agitation and settlement of 24 hours, 2000 g of the clear supernatant was removed and put into a distiller with 2 g of active charcoal powder, followed by distillation to produce 1900 g of clean water.

The characteristics of the finally produced drinking water are shown in Table 1.

TABLE 1

| | FIR emission rate (5 to 20 μm) | Emission energy (W/m² μm, 40□) | NMR test, cluster width (Hz) |
|---|---|---|---|
| Drinking water produced in Example 1 | 0.908 | $3.66 \times 10^2$ | 55.033 |

As shown in Table 1, the drinking water finally produced in Example 1 had a very high FIR emission rate of 90.8%, which is beneficial for human bodies, and had a very small cluster width of 55.033 Hz.

As described above, the drinking water prepared according to the present invention has high FIR emission rate and emission energy and a small water cluster width of about 55 Hz and is very useful for human bodies. Also, the drinking water according to the present invention does not contain heavy metals, nitrides, *E. coli* and bacterial since it is produced by distillation.

What is claimed is:

1. A method for producing drinking water having a reduced cluster width and being capable of emitting FIR (Far Infrared Rays) energy by using a solution derived by chemical treatment of a charge generating material comprising the steps of:

mixing and dissolving 40 to 50 wt % of distilled water, 2 to 3 wt % of 98% sodium hydroxide, 0.06 to 0.08 wt % of 98% calcium hydroxide in a reactor;

adding 2 to 3 wt % of charge generating material in the form of powder of 500 mesh or more to the reaction, followed by stirring at 1000 to 2000 rpm for 30 to 60 minutes;

adding 0.4 to 0.8 wt % of ferrous chloride and 3 to 5 wt % of ferric chloride to the reaction, followed by stirring at 1000 to 2000 rpm for 60-120 minutes until the blue reaction becomes completely brown color;

settling the reaction for 10 to 15 hours, followed by addition of hydrochloric acid to pH 7 for neutralization;

adding 40 to 50 wt % of distilled water to the neutralized reaction, followed by stirring for 30 to 60 minutes; and settling the stirred reaction for 24 to 36 hours, removing the clear supernatant from the reactor and distilling the supernatant with 0.1 to 0.3 wt % of active charcoal powder.

\* \* \* \* \*